(12) United States Patent
Qu et al.

(10) Patent No.: US 9,587,155 B2
(45) Date of Patent: Mar. 7, 2017

(54) EMULSION BREAKERS INCLUDING POLYESTER FUNCTIONALITIES

(71) Applicant: Ecolab USA Inc., Eagan, MN (US)

(72) Inventors: Liangwei Qu, Lake Jackson, TX (US); Jan Pieter Vijn, Nijmegen (NL); Scot Bodnar, Houston, TX (US); Carlos Lizarazo, Hengelo (NL)

(73) Assignee: Ecolab USA Inc., St. Paul, MN (US)

( * ) Notice: Subject to any disclaimer, the term of this patent is extended or adjusted under 35 U.S.C. 154(b) by 219 days.

(21) Appl. No.: 13/894,563

(22) Filed: May 15, 2013

(65) Prior Publication Data

US 2013/0324446 A1 Dec. 5, 2013

Related U.S. Application Data

(60) Provisional application No. 61/647,870, filed on May 16, 2012.

(51) Int. Cl.
*C09K 8/00* (2006.01)
*C10G 33/04* (2006.01)

(52) U.S. Cl.
CPC ............. *C09K 8/00* (2013.01); *C10G 33/04* (2013.01)

(58) Field of Classification Search
CPC .......... C09K 8/62; C09K 8/805; C09K 15/06; C09K 15/30; C09K 2208/08; C09K 2208/24; C09K 2208/26; C09K 2211/1466; C09K 2211/1475; C09K 8/00; C09K 8/035; C09K 8/467; C09K 8/56; C09K 8/68; C09K 8/70; C09K 8/602; C09K 8/524; C09K 2208/00; C09K 8/685; C09K 8/12; C09K 8/28; C09K 8/36; C09K 8/508; C09K 8/528; C09K 8/584; C09K 8/588; C09K 8/20; C09K 8/03; C09K 8/34; C09K 8/38; C09K 8/506; C09K 8/52; C09K 8/536; C09K 8/58; C09K 8/592; C09K 8/703; C09K 8/725; C09K 8/74; C09K 8/76; C09K 8/887
See application file for complete search history.

(56) References Cited

U.S. PATENT DOCUMENTS

| | | | | |
|---|---|---|---|---|
| 2,498,657 A | * | 2/1950 | Keiser | .................... C10G 33/04 |
| | | | | 516/189 |
| 2,602,079 A | * | 7/1952 | Keiser | ...................... C08F 8/00 |
| | | | | 516/74 |
| 2004/0147407 A1 | * | 7/2004 | Hahn | ................... B01D 17/047 |
| | | | | 507/200 |
| 2006/0258544 A1 | * | 11/2006 | Saini | ...................... C09K 8/035 |
| | | | | 507/219 |
| 2009/0239964 A1 | * | 9/2009 | Sasaki | ................ C08G 18/4804 |
| | | | | 521/117 |
| 2012/0157352 A1 | * | 6/2012 | Musa | ....................... C08F 8/12 |
| | | | | 507/90 |

FOREIGN PATENT DOCUMENTS

WO WO2010/114761 * 10/2010

OTHER PUBLICATIONS

G. Lando, D. Cohn, Introducing lactide-based biodegradable tissue adhesive, Journal of Material Science: Materials in Medicine, 2003, 14, 181-186.*
H. Liu, X. Wang, Y. Gu, W. Guo, Preparation and characterization of double metal cyanide, Molecules, 2003, 8, 67-73.*
PCT/US2013/041071 Notification International Search Report and Written Opinion, Aug. 14, 2013, 10 pages. (This PCT application is related to the present U.S. Appl. No. 13/894,563).

* cited by examiner

*Primary Examiner* — Kumar R Bhushan
(74) *Attorney, Agent, or Firm* — Senniger Powers LLP

(57) ABSTRACT

An emulsion breaker composition, a method of making the emulsion breaker, and method of breaking an emulsion are disclosed. In one method, an emulsion is contacted with an effective amount of an emulsion breaker composition. The emulsion breaker is a linear or branched polymer having at least one branch, wherein each branch has a first polymer block having a backbone including a plurality of ester groups and a second polymer block including an alkoxylate, and wherein at least two of the ester groups are connected by a —CR1R2 group. The emulsion breakers are preferably formed by reacting a polyol with a cyclic ester monomer in the presence of a first catalyst to form an intermediate polymer having a plurality of branches, wherein each branch has a backbone including a plurality of ester groups, and then reacting the intermediate polymer with at least one alkylene oxide species in the presence of a second catalyst to form an alkoxylate block on each branch.

19 Claims, No Drawings

EMULSION BREAKERS INCLUDING POLYESTER FUNCTIONALITIES

CROSS-REFERENCE TO RELATED APPLICATIONS

This application claims the benefit of U.S. Provisional Application No. 61/647,870 filed on May 16, 2012.

BACKGROUND OF THE INVENTION

1. Field of the Invention

The present invention relates to emulsion breakers, alternatively referred to as demulsifiers.

2. Background of the Related Art

The inevitable creation and subsequent resolution of emulsions during the production and processing of crude oils are of significant importance in the oil field industry. These emulsions, which could typically be any combination of water-in-oil, oil-in-water, or complex emulsions, are resolved by the application of chemical emulsion breakers, also known as demulsifiers. Many different chemical emulsion breakers have been developed for use in a variety of applications and conditions.

BRIEF SUMMARY OF THE INVENTION

One embodiment of the invention provides a method of breaking an emulsion. The method comprises introducing an effective amount of a emulsion breaker composition into contact with an emulsion, wherein the emulsion breaker is a linear or branched polymer having at least one branch, wherein each branch has a first polymer block having a backbone including a plurality of ester groups and a second polymer block including an alkoxylate, and wherein at least two of the ester groups are connected by a —$CR_1R_2$— group. The first polymer block is a polyester, such as polylactide or polyglycolide. The polyester may also be a copolymer, such as a copolymer formed from two or more cyclic esters selected from lactide, glycolide and caprolactone.

Another embodiment of the invention provides a method of breaking an emulsion, comprising introducing an effective amount of an emulsion breaker composition into contact with an emulsion. In this embodiment, the emulsion breaker is formed by (i) reacting a polyol with a monomer selected from lactide, glycolide, and combinations thereof in the presence of a first catalyst to polymerize the monomer and form an intermediate polymer having a plurality of branches, wherein each branch has a backbone including a plurality of ester groups; and then (ii) reacting the intermediate polymer with at least one alkylene oxide species to form an alkoxylate block on each branch.

Yet another embodiment of the invention provides a method of forming an emulsion breaker. The method comprises reacting a polyol with at least one cyclic diester monomer selected from lactide and glycolide in the presence of a first catalyst to polymerize the monomer to form an intermediate polymer having a plurality of branches, wherein each branch has a backbone including a plurality of ester groups, wherein at least two of the ester groups in each branch are connected via a —$CR_1R_2$— group. The method then further comprises reacting the intermediate polymer with at least one alkylene oxide species in the presence of a second catalyst to form an alkoxylate block on each branch.

DETAILED DESCRIPTION OF THE INVENTION

Embodiments of the present invention include an emulsion breaker composition, a method of making the emulsion breaker, and method of breaking an emulsion.

One embodiment of the invention provides a method of breaking an emulsion. The method comprises introducing an effective amount of a emulsion breaker composition into contact with an emulsion, wherein the emulsion breaker is a linear or branched polymer having at least one branch, wherein each branch has a first polymer block having a backbone including a plurality of ester groups and a second polymer block including an alkoxylate, and wherein at least two of the ester groups are connected by a —$CR_1R_2$— group. Preferably, $R_1$ and $R_2$ are independently selected from hydrogen and alkyl groups having from 1 to 16 carbons. The first polymer block is a polyester, such as polylactide or polyglycolide. The polyester may also be a copolymer, such as a copolymer formed from two or more cyclic esters selected from lactide, glycolide and caprolactone.

Where the emulsion breaker is a linear polymer, the single branch may be attached to a starter compound that has a single hydroxyl group (i.e., a mono-alcohol). An emulsion breaker having two branches may be formed with a starter compound that is a diol. In general, the starter compound may have a hydroxyl group for each desired branch, such that a branch is formed in the place of each hydroxyl group. For example, the starter compound may be, without limitation, a polyol selected from ethylene glycol, trimethylolpropane, glycerol, polyglycerol, pentaerythritol, sorbitol, sucrose, castor oil, hydroxylated soybean oil, and combinations thereof.

The alkoxylate that forms the second polymer block may be a mixed oxide block including two or more alkylene oxide species. In one embodiment, the alkoxylate is a mixed oxide block including a mixture of propylene oxide and ethylene oxide. Other alkylene oxides, such as butylene oxide, may also be included in a mixed oxide block. Alternatively, the second polymer block includes two or more alkoxylate sub-blocks. For example, the two or more alkoxylate sub-blocks includes a first sub-block of propylene oxide and a second sub-block that is a mixed oxide of propylene oxide and ethylene oxide.

In one preferred embodiment, the starter compound is the polyol trimethylolpropane and the first polymer block is polylactide, wherein the polylactide blocks are formed by reacting trimethylolpropane and lactide at a trimethylolpropane:lactide weight ratio ranging from 4 (4× more TMP than lactide) to 0.01 (80× more lactide than TMP). As with other embodiments, the alkoxylate may form a mixed oxide block including two or more alkylene oxide species, such as a mixture of propylene oxide and ethylene oxide. Most preferably, the mixed oxide block is attached directly to the polylactide.

Another embodiment of the invention provides a method of breaking an emulsion, comprising introducing an effective amount of an emulsion breaker composition into contact with an emulsion. In this embodiment, the emulsion breaker is formed by (i) reacting a polyol with a monomer selected from lactide, glycolide, and combinations thereof in the presence of a first catalyst to polymerize the monomer and form an intermediate polymer having a plurality of branches, wherein each branch has a backbone including a plurality of ester groups; and then (ii) reacting the intermediate polymer with at least one alkylene oxide species to form an alkoxylate block on each branch.

In accordance with a preferred option, the first catalyst is stannous octoate and the second catalyst is a double metal cyanide (DMC) catalyst. Stannous octoate is also known as Tin(II) 2-ethylhexanoate and tin(II) octoate. One suitable double metal cyanide catalyst is commercially available under the name Arcol Catalyst 3 (dry) from Bayer Material Science LLC of Pittsburgh, Pa. In other embodiments, the first and second catalysts may be other organo-metallic catalysts. The polyol may, for example, be selected from ethylene glycol, trimethylolpropane, glycerol, polyglycerol, pentaerythritol, sorbitol, sucrose, castor oil, hydroxylated soybean oil, and combinations thereof.

In a specific embodiment, the polyol is trimethylolpropane and the monomer is lactide, and wherein the trimethylolpropane and lactide are provided to the reaction at a trimethylolpropane:lactide weight ratio ranging from 4 to 0.01. A preferred reaction is where the first catalyst is stannous octoate and the second catalyst is a double metal cyanide catalyst. Accordingly, the stannous octoate is used to form an intermediate polymer having polylactide branches. The double metal cyanide catalyst is then used to form an alkoxylate polymer attached to each polylactide branch. The alkoxylate may be, for example, a mixed oxide block including two or more alkylene oxide species, such as a mixture of propylene oxide and ethylene oxide. It may be beneficial for the mixed oxide block to be attached directly to the polylactide so that there are no intervening single oxide blocks, such as a propylene oxide block. A double metal cyanide catalyst is preferred for the alkoxylation reaction because it allows for a higher MW build and lower polydispersity than other catalysts, and also because it avoids hydrolysis of the ester functionality in the polylactide or other polyester. It should be recognized that the stannous octoate catalyst and double metal cyanide catalyst may be independently substituted with other organo-metallic catalysts that are suitable for the respective reactions.

Yet another embodiment of the invention provides a method of forming an emulsion breaker. The method comprises reacting a polyol with at least one cylic diester monomer selected from lactide and glycolide in the presence of a first catalyst to polymerize the monomer to form an intermediate polymer having a plurality of branches, wherein each branch has a backbone including a plurality of ester groups, wherein at least two of the ester groups in each branch are connected via a —CR1R2 group. The method then further comprises reacting the intermediate polymer with at least one alkylene oxide species in the presence of a second catalyst to form an alkoxylate block on each branch.

Lactide and glycolide are cyclic diesters having two ester groups connected by a —CR1R2 group. The resulting polyester polymer still contains the ester groups connected by the —CR1R2. Optional embodiments may further include caprolactone, which is a cyclic monoester. In the case of lactide, the R1 and R2 groups would be —CH$_3$ and H (Structure 1), and depending on the stereochemistry at the centers a and b, the lactide can be optically active (D and L forms) or inactive meso forms. An equal mixture of D and L forms constitute another optically inactive form known as a racemic mixture, and unequal amounts of either D or L forms result in partially optically-active lactide. In the case of glycolide (Structure 2), the R1 and R2 groups would both be hydrogen (H).

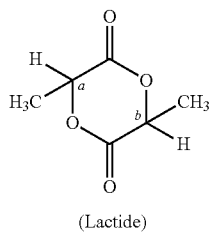

(Lactide)

Structure 1

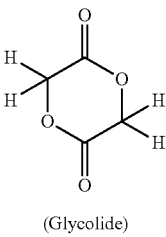

(Glycolide)

Structure 2

Samples of Puralact L (L-lactide) and Puralact D (D-Lactide) are available from PURAC America Inc., Lincolnshire, Ill. (USA). Samples of other lactide forms, such as L-100 (Low D-Lactide), M700X or M-3000 (Meso forms), are available from Nature Works, LLC, Minnetonka, Minn. (USA).

In a preferred method of forming an emulsion breaker, the first catalyst is stannous octoate and the second catalyst is a double metal cyanide catalyst. The polyol may, for example, be selected from ethylene glycol, trimethylolpropane, glycerol, polyglycerol, pentaerythritol, sorbitol, sucrose, castor oil, hydroxylated soybean oil, and combinations thereof.

In a specific embodiment, the polyol is trimethylolpropane and the monomer is lactide, and wherein the trimethylolpropane and lactide are provided to the reaction at a trimethylolpropane:lactide weight ratio ranging from 4 to 0.01. In a preferred method, the first catalyst is stannous octoate and the second catalyst is a double metal cyanide catalyst. Accordingly, the stannous octoate is used in a first addition condensation reaction to form an intermediate polymer having polylactide branches. The double metal cyanide catalyst is then used in a second, alkoxylation reaction to form an alkoxylate polymer attached to each polylactide branch. The alkoxylate may be, for example, a mixed oxide block including two or more alkylene oxide species, such as a mixture of propylene oxide and ethylene oxide. It may be beneficial for the mixed oxide block to be attached directly to the polylactide so that there are no intervening single oxide blocks, such as a propylene oxide block.

The emulsion breakers described and used herein may be a linear or branched polymer having a polymeric portion including a first block having a plurality of ester groups connected via a —CR1R2 group, and a second block comprising an alkoxylate. In a first option, the first block is attached to a starter compound and the second block is attached to the first block. In a second option, the second block is attached to a starter compound and the first block is attached to the second block. In other words, the arrangement of the first and second blocks may be reversed with respect to attachment with the starter compound.

A still further embodiment provides a method of forming an emulsion breaker, comprising reacting a starter compound, at least one monomer selected from lactide, glycolide and caprolactone, a first catalyst to polymerize the at least one monomer, at least one alkylene oxide species, and a second catalyst to polymerize the at least one alkylene oxide species. This synthesis procedure will result in a distribution of the ester functionalities and the alkoxylate functionalities throughout the length of the polymer or polymer branches. Optionally, the first catalyst may be stannous octoate and the second catalyst may be a double metal cyanide catalyst. In reactions that include a double metal cyanide catalyst, a preferred starter compound is a polyol that does not include an amine functionality. The at least one alkylene oxide species may, for example, include a propylene oxide and ethylene oxide.

Further embodiments of the invention provide emulsion breakers produced by the methods disclosed herein.

EXAMPLES

Example 1

Incorporation of 9.6 Wt % Poly Lactide into Demulsifiers Using Trimethylolpropane (TMP) as a Starter Trimethylolpropane (60.0 g, 0.447 mol) and L-lactide (240.0 g, 1.665 mol) were added to a reaction flask (2 Liter autoclave), which was equipped with agitation, condenser and thermometer. After it was dehydrated by nitrogen purging at 110° C. for 30 min, Tin(II) 2-ethylhexanoate (0.8 g) was added into the reaction flask. The polymerization was carried out under stirring for 6 hrs at 110° C.

Double metal cyanide catalyst (0.2 g) was added to the above resulting polylactide in the same reaction flask. When the temperature reached 125° C., propylene oxide (PO) (1200 g, 20.661 mol) and mixed oxide (MO) (ethylene oxide (EO) and PO in a 1:1 wt ratio) (1000 g, 11.351 mol EO and 8.609 mol PO, roughly a 1.32:1 molar ratio of EO to PO respectively) were added continuously at a speed of 5 g/min until it reached the targeted hydroxyl equivalent weight which corresponded to a target wt % of PO and MO respectively. See Table 1.

Example 2

Incorporation of 18.6 Wt % Poly Lactide into Demulsifiers Using Trimethylolpropane (TMP) as a Starter Trimethylolpropane (30 g, 0.224 mol) and L-lactide (242.5 g, 1.683 mol) were added to a reaction flask (2 Liter autoclave), which was equipped with agitation, condenser and thermometer. After it was dehydrated by nitrogen purging at 110° C. for 30 min, Tin(II) 2-ethylhexanoate (0.4 g) was added into the reaction flask. The polymerization was carried out under stirring for 6 hrs at 110° C.

Double metal cyanide catalyst (0.1 g) was added to the above resulting polylactide in the same reaction flask. When the temperature reached 125° C., propylene oxide (PO) (528.1 g, 9.093 mol) and mixed oxide (MO) (ethylene oxide (EO) and PO in a 1:1 wt ratio) (503.3 g, 5.714 mol EO and 4.332 mol PO, roughly a 1.32:1 molar ratio of EO to PO respectively) were added continuously at a speed of 5 g/min until it reached the targeted hydroxyl equivalent weight which corresponded to a target wt % of PO and MO respectively. See Table 1.

Example 3

Incorporation of 35.9 Wt % Poly Lactide into Demulsifiers Using Trimethylolpropane (TMP) as a Starter Trimethylolpropane (15 g, 0.112 mol) and L-lactide (244.8 g, 1.698 mol) were added to a reaction flask (2 Liter autoclave), which was equipped with agitation, condenser and thermometer. After it was dehydrated by nitrogen purging at 110° C. for 30 min, Tin(II) 2-ethylhexanoate (0.2 g) was added into the reaction flask. The polymerization was carried out under stirring for 6 hrs at 110° C.

Double metal cyanide catalyst (0.05 g) was added to the above resulting polylactide in the same reaction flask. When the temperature reached 125° C., propylene oxide (PO) (169.1 g, 2.912 mol) and mixed oxide (MO) (ethylene oxide (EO) and PO in a 1:1 wt ratio) (252.9 g, 2.872 mol EO and 2.176 mol PO, roughly a 1.32:1 molar ratio of EO to PO respectively) were added continuously at a speed of 5 g/min until it reached the targeted hydroxyl equivalent weight which corresponded to a target wt % of PO and MO respectively. See Table 1.

Example 4

Incorporation of 45.0 Wt % Poly Lactide into Demulsifiers Using Trimethylolpropane (TMP) as a Starter Trimethylolpropane (16.8 g, 0.125 mol) and L-lactide (315 g, 2.186 mol) were added to a reaction flask (2 Liter autoclave), which was equipped with agitation, condenser and thermometer. After it was dehydrated by nitrogen purging at 110° C. for 30 min, Tin(II) 2-ethylhexanoate (0.2 g) was added into the reaction flask. The polymerization was carried out under stirring for 6 hrs at 110° C.

Double metal cyanide catalyst (0.05 g) was added to the above resulting polylactide in the same reaction flask. When the temperature reached 125° C., propylene oxide (PO) (88.2 g, 1.519 mol) and mixed oxide (MO) (ethylene oxide (EO) and PO in a 1:1 wt ratio) (280 g, 3.178 mol EO and 2.410 mol PO, roughly a 1.32:1 molar ratio of EO to PO respectively) were added continuously at a speed of 5 g/min until it reached the targeted hydroxyl equivalent weight which corresponded to a target wt % of PO and MO respectively. See Table 1.

Example 5

Incorporation of 57.6 Wt % Poly Lactide into Demulsifiers Using Trimethylolpropane (TMP) as a Starter Trimethylolpropane (14.2 g, 0.106 mol) and L-lactide (341 g, 2.366 mol) were added to a reaction flask (2 Liter autoclave), which was equipped with agitation, condenser and thermometer. After it was dehydrated by nitrogen purging at 110° C. for 30 min, Tin(II) 2-ethylhexanoate (0.2 g) was added into the reaction flask. The polymerization was carried out under stirring for 6 hrs at 110° C.

Double metal cyanide catalyst (0.05 g) was added to the above resulting polylactide in the same reaction flask. When the temperature reached 125° C., mixed oxide (MO) (ethylene oxide (EO) and PO in a 1:1 wt ratio) (237 g, 2.690 mol EO and 2.040 mol PO, roughly a 1.32:1 molar ratio of EO to PO respectively) was added continuously at a speed of 5 g/min until it reached the targeted hydroxyl equivalent weight which corresponded to a target wt % of MO. See Table 1.

TABLE 1

| Example | TMP (wt %) | Lactide (wt %) | PO (wt %) | MO (1/1) (wt %) |
|---|---|---|---|---|
| 1 | 2.4 | 9.6 | 48.0 | 40.0 |
| 2 | 2.3 | 18.6 | 40.5 | 38.6 |
| 3 | 2.2 | 35.9 | 24.8 | 37.1 |
| 4 | 2.4 | 45.0 | 12.6 | 40.0 |
| 5 | 2.4 | 57.6 | 0.0 | 40.0 |

Example 6

Incorporation of 30.0 Wt % Poly Lactide into Demulsifiers Using Castor Oil as a Starter Castor Oil (282.2 g) and L-lactide (510 g) were added to a reaction flask (2 Liter autoclave), which was equipped with agitation, condenser and thermometer. After it was dehydrated by nitrogen purging at 110° C. for 30 min, Tin(II) 2-ethylhexanoate (0.2 g) was added into the reaction flask. The polymerization was carried out under stirring for 6 hrs at 120° C. Castor oil is a natural product that is a mixture of a range of different molecular weight species.

Double metal cyanide catalyst (0.05 g) was added to the above resulting polylactide in the same reaction flask. When the temperature reached 125° C., mixed oxide (MO) (ethylene oxide (EO) and PO in a 1:1.14 wt ratio respectively) (907.8 g) was added continuously at a speed of 5 g/min until it reached the targeted hydroxyl equivalent weight which corresponded to a target wt % of MO.

Performance Testing:

Examples 1-5 were built off of a Trimethylolpropane (TMP) "starter" polyol. It is clearly seen in the Examples 1-5 that the amount of poly-Lactide incorporated into the molecule increases from 9.6 wt % in Example 1 up to 57.6 wt % in Example 5. The additional poly-Lactide is offset mainly by a reduction in the PO wt % with an attempt to keep the TMP and Mixed Oxide (MO) block approximately the same throughout the series (~2.4 wt % and ~40 wt % respectively). See Table 1.

Table 2 presents an example set of data presenting the percent water drop in emulsified crude oil samples from a field in Germany. The concentrations of the examples are given in Parts Per Million (ppm).

TABLE 2

| | Water Drop Performance (milliliters) | | | | |
|---|---|---|---|---|---|
| Example | Conc. (ppm) | 15 min. | 30 min. | 60 min. | 90 min. |
| Typical Demulsifier A | 100 | 15 | 40 | 40 | 41 |
| Typical Demulsifier A | 200 | 40 | 45 | 44 | 44 |
| Typical Demulsifier B | 100 | 3 | 20 | 42 | 42 |
| Typical Demulsifier B | 200 | 4 | 22 | 42 | 42 |
| 1 | 100 | 3 | 31 | 42 | 42 |
| 1 | 200 | 6 | 39 | 44 | 44 |
| 2 | 100 | 4 | 31 | 43 | 43 |
| 2 | 200 | 9 | 42 | 47 | 48 |
| 3 | 100 | 7 | 39 | 48 | 48 |
| 3 | 200 | 22 | 40 | 42 | 42 |

*Typical Demulsifiers A, B, and C (in Tables 2-4) are TMP based materials made from the traditional process of manufacturing using traditional catalysts (KOH or NaOH) and traditional alkoxylation profiles (EO and PO and mixtures thereof). These materials do not have any polyester (i.e., no polylactide, etc.) incorporated into their structures.

Table 2 shows that the emulsion breakers prepared in accordance with examples 1-3 initially gave a less water drop than the typical demulsifiers A and B, but after 60-90 minutes lead to greater water drop.

TABLE 3

| | Water Drop Performance (milliliters) | | | | |
|---|---|---|---|---|---|
| Example | Conc. (ppm) | 15 min. | 30 min. | 60 min. | 90 min. |
| Typical Demulsifier A | 50 | 0 | 3 | 18 | 22 |
| Typical Demulsifier A | 100 | 33 | 33 | 35 | 32 |
| Typical Demulsifier A | 200 | 40 | 40 | 40 | 40 |
| Typical Demulsifier B | 50 | 0 | 0 | 3 | 8 |
| Typical Demulsifier B | 100 | 3 | 9 | 32 | 32 |
| Typical Demulsifier B | 200 | 5 | 10 | 39 | 40 |
| 3 | 50 | 0 | 0 | 14 | 19 |
| 3 | 100 | 0 | 9 | 32 | 32 |
| 3 | 200 | 5 | 15 | 36 | 36 |
| 4 | 50 | 0 | 0 | 20 | 20 |
| 4 | 100 | 3 | 5 | 30 | 30 |
| 4 | 200 | 5 | 10 | 35 | 35 |
| 5 | 50 | 0 | 2 | 20 | 20 |
| 5 | 100 | 0 | 10 | 30 | 30 |
| 5 | 200 | 8 | 26 | 34 | 34 |

Table 3 shows that Examples 3-5 are clearly emulsion breakers, but may not be the best choice for this specific field. It is well known that Emulsion Breaker performance is highly dependent on the particular field and produced fluids.

TABLE 4

| | Water Drop Performance (milliliters) | | | | |
|---|---|---|---|---|---|
| Example | Conc. (ppm) | 15 min. | 30 min. | 60 min. | 120 min. |
| Typical Demulsifier C | 100 | 22 | 28 | 28 | 29 |
| 6 | 100 | 31 | 31 | 32 | 33 |

Table 4 shows the emulsion breaker of example 6 yields both a faster water drop and a better overall water drop than the typical demulsifier C.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of breaking an emulsion, comprising:
   introducing an effective amount of an emulsion breaker composition into contact with the emulsion, wherein the emulsion breaker is a branched polymer having two or more branches, wherein each branch has a first polymer block having a backbone including a plurality of ester groups and a second polymer block including two alkoxylate sub-blocks, wherein the two alkoxylate sub-blocks include a first sub-block of propylene oxide and a second sub-block that is a mixed oxide of propylene oxide and ethylene oxide, and wherein at least two of the ester groups are connected via a —$CR_1R_2$ group, wherein $R_1$ and $R_2$ are independently selected from hydrogen or $C_1$ to $C_{16}$ alkyl;
   wherein each branch is attached to a polyol and the polyol is selected from trimethylolpropane, glycerol, polyglycerol, pentaerythritol, sorbitol, sucrose, castor oil, hydroxylated soybean oil, and a combination thereof.

2. The method of claim 1, wherein the polyol is trimethylolpropane, the first polymer block is derived from a monomer and the monomer is lactide, glycolide or a combination thereof, and wherein the trimethylolpropane and monomer are provided to the reaction at a trimethylolpropane:monomer weight ratio ranging from 4 to 0.01.

3. The method of claim 2, wherein the monomer is lactide selected from D-lactide, L-lactide, meso stereoisomers of lactide, and a combination thereof.

4. The method of claim 2, wherein the monomer is a racemic mixture of lactides.

5. The method of claim 1, wherein the second sub-block is attached directly to the first polymer block.

6. The method of claim 1, wherein the second sub-block further includes butylene oxide.

7. The method of claim 1, wherein the polyol is castor oil.

8. The method of claim 1, wherein the first block is attached to the polyol and the second block is attached to the first block.

9. The method of claim 1, wherein the second block is attached to the polyol and the first block is attached to the second block.

10. A method of breaking an emulsion, comprising
    introducing an effective amount of an emulsion breaker composition into contact with the emulsion, wherein the emulsion breaker is formed by (i) reacting a polyol with a monomer selected from lactide, glycolide, and combinations thereof in the presence of a first catalyst to polymerize the monomer and form an intermediate polymer having a plurality of branches, wherein each branch has a backbone including a plurality of ester groups; and then (ii) reacting the intermediate polymer with at least one alkylene oxide species in the presence of a second catalyst to form two alkoxylate sub-blocks on each branch, wherein the two alkoxylate sub-blocks include a first sub-block of propylene oxide and a second sub-block that is a mixed oxide of propylene oxide and ethylene oxide, and wherein the polyol is selected from trimethylolpropane, glycerol, polyglycerol, pentaerythritol, sorbitol, sucrose, castor oil, hydroxylated soybean oil, and a combination thereof.

11. The method of claim 10, wherein the monomer is lactide selected from D-lactide, L-lactide, meso stereoisomers of lactide, and a combination thereof.

12. The method of claim 10, wherein the first catalyst is stannous octoate and the second catalyst is a double metal cyanide catalyst.

13. The method of claim 12, wherein the polyol is selected from trimethylolpropane, glycerol, polyglycerol, pentaerythritol, sorbitol, sucrose, castor oil, hydroxylated soybean oil, and a combination thereof.

14. The method of claim 10, wherein the polyol is trimethylolpropane, and wherein the trimethylolpropane and monomer are provided to the reaction at a trimethylolpropane:monomer weight ratio ranging from 4 to 0.01.

15. The method of claim 14, wherein the monomer is lactide selected from D-lactide, L-lactide, meso stereoisomers of lactide, and a combination thereof.

16. The method of claim 14, wherein the monomer is a racemic mixture of lactides.

17. The method of claim 14, wherein the first catalyst is stannous octoate and the second catalyst is a double metal cyanide catalyst.

18. The method of claim 10, wherein the second sub-block is attached directly to the first polymer block.

19. The method of claim 10, wherein the polyol is castor oil.

\* \* \* \* \*

UNITED STATES PATENT AND TRADEMARK OFFICE
CERTIFICATE OF CORRECTION

PATENT NO.        : 9,587,155 B2
APPLICATION NO.   : 13/894563
DATED             : March 7, 2017
INVENTOR(S)       : Qu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 401 days.

Signed and Sealed this
Twenty-fifth Day of September, 2018

Andrei Iancu
*Director of the United States Patent and Trademark Office*